(12) United States Patent
Mayer

(10) Patent No.: US 9,731,858 B2
(45) Date of Patent: Aug. 15, 2017

(54) TWIST-OFF CROWN CAP ORIFICE WITH SPLINTERING PROTECTION

(71) Applicant: Vetropack Austria GmbH, Pöchlarn (AT)

(72) Inventor: Engelbert Mayer, Krummnussbaum (AT)

(73) Assignee: Vetropack Austria GmbH, Pöchlarn (AT)

( * ) Notice: Subject to any disclaimer, the term of this patent is extended or adjusted under 35 U.S.C. 154(b) by 28 days.

(21) Appl. No.: 14/429,699

(22) PCT Filed: Jan. 10, 2013

(86) PCT No.: PCT/EP2013/050421
§ 371 (c)(1),
(2) Date: Mar. 19, 2015

(87) PCT Pub. No.: WO2014/044409
PCT Pub. Date: Mar. 27, 2014

(65) Prior Publication Data
US 2015/0225106 A1    Aug. 13, 2015

(30) Foreign Application Priority Data

Sep. 19, 2012  (AT) ............................... GM370/2012
Sep. 19, 2012  (DE) .................... 20 2012 103 589 U

(51) Int. Cl.
*B65D 1/02*  (2006.01)
*B65D 41/17*  (2006.01)
(Continued)

(52) U.S. Cl.
CPC .......... *B65D 1/0246* (2013.01); *B65D 1/023* (2013.01); *B65D 1/0223* (2013.01); *B65D 41/17* (2013.01);
(Continued)

(58) Field of Classification Search
USPC ................. 215/44, 318, 328, 40, 41, 43, 45; 65/360, 361, 362, 170, 227, 229, 224, 72;
(Continued)

(56) References Cited

U.S. PATENT DOCUMENTS 1,724,213 A * 8/1929 McDonnell ........ B65D 41/0464
215/277
2,080,144 A * 5/1937 Lufkin .................. B65D 23/06
215/349
(Continued)

FOREIGN PATENT DOCUMENTS

BE           660048      8/1965
CH           457168      5/1968
(Continued)

OTHER PUBLICATIONS

"International Application No. PCT/EP2013/050421, International Search Report and Written Opinion mailed Jul. 23, 2013", (Jul. 23, 2013), 25 pgs.
(Continued)

*Primary Examiner* — J. Gregory Pickett
*Assistant Examiner* — Gideon Weinerth
(74) *Attorney, Agent, or Firm* — Schwegman Lundberg & Woessner, P.A.

(57) ABSTRACT

Embodiments of the present invention relate to a mouth piece for a bottle with a twist-off crown cap closure, wherein the mouth piece comprises a mouth piece body with a dispensing opening at the end; a closure thread for interaction with a twist-off crown cap in order to close off the dispensing opening so that it is liquid-tight, which closure thread comprises a plurality of thread protrusions arranged over regions of the circumference of the mouth piece body at a predeterminable thread pitch, protruding from the exterior side of the mouth piece body; a discontinuity running
(Continued)

circumferentially around the mouth piece body, arranged between the dispensing opening and the closure thread and formed as a result of a tool during manufacture of the mouth piece in a transition region between two orifice jaws on the one hand, and a guide disc on the other hand; wherein an exterior end of the discontinuity is offset inwards relative to an exterior surface of the mouth piece body situated between axially adjacent thread protrusions. Likewise, embodiments of the present invention relate to a corresponding bottle, to a tool for producing a mouth piece for a bottle with a twist-off crown cap closure, and to a method for producing a mouth piece for a bottle with a twist-off crown cap closure.

15 Claims, 6 Drawing Sheets

(51) Int. Cl.
    *C03B 9/325*     (2006.01)
    *C03B 9/34*     (2006.01)
(52) U.S. Cl.
    CPC ............... *C03B 9/325* (2013.01); *C03B 9/34* (2013.01); *C03B 9/342* (2013.01)
(58) Field of Classification Search
    USPC .......................................... 220/656–659, 288
    See application file for complete search history.

(56) References Cited

U.S. PATENT DOCUMENTS

| | | | |
|---|---|---|---|
| 2,265,015 A | 12/1941 | Watson | |
| 2,298,777 A * | 10/1942 | Thomas | B65D 41/04 215/324 |
| 2,304,826 A | 12/1942 | Jackson | |
| 2,445,647 A * | 7/1948 | Thomas | B65D 41/16 215/307 |
| 2,492,144 A * | 12/1949 | Gora | B65D 53/04 215/345 |
| 2,670,868 A * | 3/1954 | Stover | B65D 43/0222 215/46 |
| 2,788,161 A * | 4/1957 | Kemper | B65D 23/06 215/41 |
| 3,181,720 A * | 5/1965 | Cassie | B65D 1/0246 215/260 |
| 3,203,576 A | 8/1965 | Wout et al. | |
| 3,532,243 A * | 10/1970 | Acton | B65D 41/0457 215/334 |
| 3,556,334 A * | 1/1971 | Howard | B65D 1/0253 215/302 |
| 3,559,833 A * | 2/1971 | Alonso | B65D 1/0246 215/324 |
| 3,690,497 A * | 9/1972 | Lecinski, Jr. | B65D 41/0457 215/318 |
| 3,774,795 A | 11/1973 | Leenaards | |
| 4,007,848 A * | 2/1977 | Snyder | B65D 41/348 215/307 |
| 4,436,543 A * | 3/1984 | Kasten | C03B 9/48 425/525 |
| 4,487,325 A * | 12/1984 | Willingham | B65D 41/0435 215/307 |
| 4,560,077 A | 12/1985 | Dutt | |
| 4,562,930 A * | 1/1986 | Lecinski, Jr. | B65D 41/0457 215/44 |
| 4,603,786 A * | 8/1986 | Lecinski, Jr. | B65D 41/0457 215/318 |
| 4,662,928 A * | 5/1987 | Dauer | C03B 9/165 65/236 |
| 5,609,664 A * | 3/1997 | Olson | C03B 9/165 425/525 |
| 5,722,545 A * | 3/1998 | Rinne | B65D 41/0471 215/330 |
| 5,806,700 A | 9/1998 | Henning | |
| 5,893,942 A | 4/1999 | Nickey et al. | |
| 7,854,106 B2 * | 12/2010 | Martin | B65D 41/0457 215/318 |
| 8,286,449 B2 * | 10/2012 | Bosken, Jr. | B22F 7/08 215/42 |
| 2006/0144092 A1 | 7/2006 | Flynn | |
| 2009/0249835 A1 * | 10/2009 | Flynn | C03B 9/325 65/172 |
| 2012/0000879 A1 | 1/2012 | McFarlane et al. | |
| 2015/0013416 A1 * | 1/2015 | Hosoi | B21D 51/38 72/68 |
| 2015/0135773 A1 * | 5/2015 | Jaenecke | B65D 1/023 65/76 |
| 2015/0375888 A1 * | 12/2015 | Hosoi | B21D 51/2615 215/44 |

FOREIGN PATENT DOCUMENTS

| | | |
|---|---|---|
| DE | 230105 | 1/1911 |
| DE | 29515026 | 12/1995 |
| DE | 29822885 | 3/1999 |
| GB | 274635 | 7/1927 |
| GB | 2100236 | 12/1982 |
| JP | 2000-034129 | 2/2000 |
| WO | WO-83/04246 | 12/1983 |
| WO | WO-2014/044409 | 3/2014 |

OTHER PUBLICATIONS

"International Application No. PCT/Ep2013/050421, English translation of International Preliminary Report on Patentability mailed Apr. 2, 2015", (Apr. 2, 2015), 19 pgs.

* cited by examiner

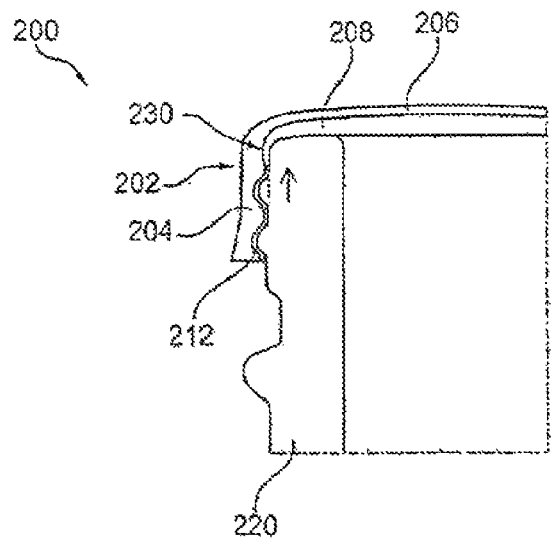
Fig. 2 (Conventional)

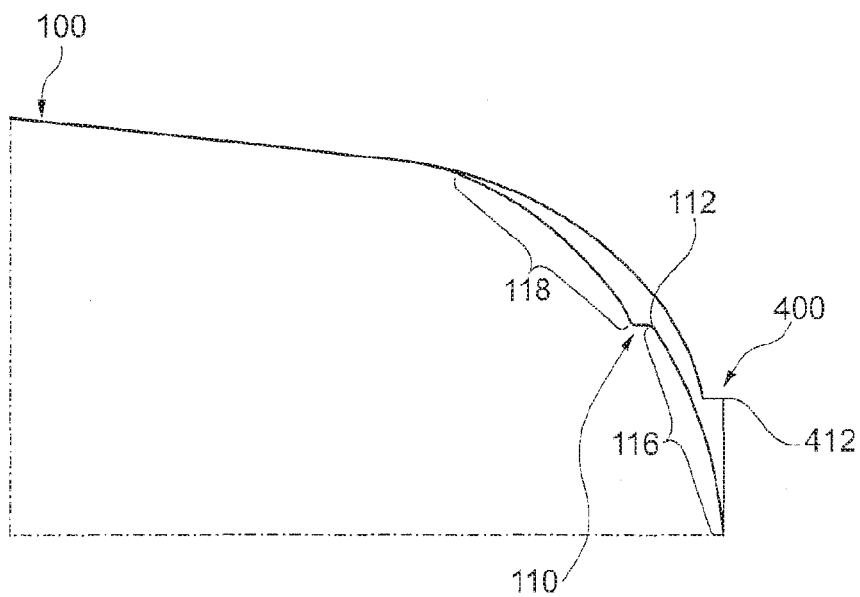
Fig. 4
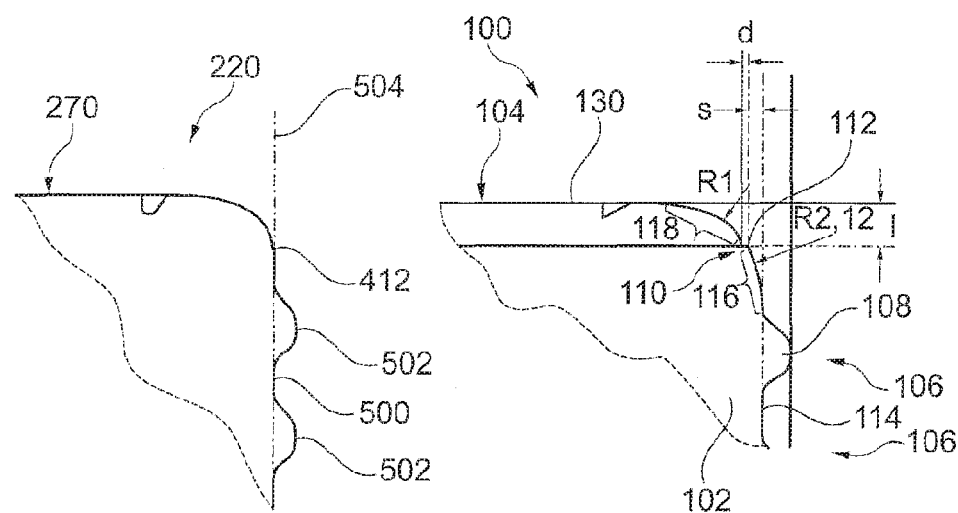
Fig. 5
(Conventional)
Fig. 6

TWIST-OFF CROWN CAP ORIFICE WITH SPLINTERING PROTECTION

PRIORITY CLAIM TO RELATED APPLICATIONS

This application is a U.S. national stage application filed under 35 U.S.C. §371 from International Application Serial No. PCT/EP2013/050421, which was filed Jan. 10, 2013, and published as WO 2014/044409 on Mar. 27, 2014, and which claims priority to German Application No. 20 2012 103 589.8, filed Sep. 19, 2012, and to Austrian Application No. GM 370/2012, filed Sep. 19, 2012, which applications and publication are incorporated by reference as if reproduced herein and made a part hereof in their entirety, and the benefit of priority of each of which is claimed herein.

FIELD OF THE INVENTION

Embodiments of the invention relate to a mouth piece, a bottle, a tool for producing a mouth piece, a method for producing a mouth piece and a method for producing a bottle.

From prior art, a host of different closures for bottles, for example beverage bottles, are known. Such a conventional bottle closure uses a crown cap. However, for quite some time, twist-off crown caps have also been used that are removed from a bottle in that the consumer rotates them in order to open said bottle. Such a twist-off crown cap can be constructed as a sheet metal part comprising a seal, which sheet metal part is formed on the mouth piece of a bottle by means of a thread, and consequently a corresponding mating thread is formed.

In the bottle industry such a twist-off-crown mouth piece is produced according to specifications of the International Technical Center for Bottling and related Packaging (CE.T.I.E.). Such a twist-off-crown mouth piece is kept under the designation 26 H 126 (CE.T.I.E., documentation sheet 14.02, edition 07/03).

Such a twist-off-crown mouth piece is produced by means of three tool parts. Between two orifice jaws, which can be placed together, a cavity is formed that defines an orifice production mold, i.e. a negative mold of the twist-off-crown mouth piece to be produced. Thus the forming of a mouth piece body with a glass thread has been specified. In order to make it possible for the bottle to be removed from the casting mold a third tool part is used, namely a guide disc that is received in another cavity of the orifice jaws and that defines the dispensing end of the bottle. At a boundary face between the orifice jaws and the guide disc a step or a ridge necessarily forms just below the top of the bottle.

In twist-off-crown mouth pieces 26 H 126 up to now, inexplicably, in isolated cases splintering has occurred when a user removes the twist-off crown cap from the mouth piece. This represents a danger in particular in the case of beverage bottles, because glass splinters can enter the bottle, and consequently a user may swallow them while drinking. Moreover, resulting sharp edges on the mouth piece of the bottle can result in a user being injured.

SUMMARY OF THE INVENTION

There may be a need to provide a mouth piece for a bottle with a twist-off crown cap closure by means of which any splintering of material of the mouth piece when taking off the twist-off crown cap is avoided.

This need may be met by the subjects with the features according to the independent claims. Further exemplary embodiments are shown in the dependent claims.

According to one exemplary embodiment of the present invention, there is provided a mouth piece for a bottle with a twist-off crown cap closure, wherein the mouth piece comprises a mouth piece body with a dispensing opening at the end (which dispensing opening can also be referred to as the dispensing end); a closure thread for interacting with a twist-off crown cap in order to close off the dispensing opening so that it is liquid-tight, in particular also gas-tight, which closure thread is formed by a plurality of thread protrusions arranged along a partial region of the circumference of the mouth piece body at a predeterminable thread pitch, the plurality of thread protrusions protruding from the exterior side of the mouth piece body; and a discontinuity running circumferentially around the mouth piece body, arranged between the dispensing opening and the closure thread and formed as a result of a tool during a manufacture of the mouth piece in a transition region between two orifice jaws on the one hand and a guide disc on the other hand, wherein an exterior end of the discontinuity is offset inwards relative to an exterior surface of the mouth piece body situated between axially adjacent thread protrusions (in particular relative to the symmetry axis of the bottle).

According to a further exemplary embodiment of the present invention, there is provided a bottle that comprises a mouth piece with the features described above, and a body of the bottle being connected to the mouth piece and integrally formed thereto. In this design the body of the bottle can, for example, comprise integrally connected molded bottle halves and a finished formed bottom.

According to yet another exemplary embodiment of the present invention, there is provided a tool for producing a mouth piece for a bottle with a twist-off crown cap closure, wherein the tool comprises two orifice jaws and a guide disc (i.e. three tool parts) that can be received in a positive-locking manner in a guide disc receiving device, which guide disc receiving device in a state, where the orifice jaws have been placed together, is formed between said orifice jaws, wherein—in the placed-together state of the orifice jaws, in which state the guide disc is received—the orifice jaws and the guide disc delimit an orifice production mold (descriptively a negative mold of the exterior of the mouth piece to be produced) that is formed in such a manner that by means of the supply of free-flowing mouth piece raw material (in particular liquid glass) into the orifice production mold a mouth piece body can be formed in between the orifice jaws; by means of the guide disc an end side dispensing opening at the mouth piece body is delimited; between the orifice jaws a closure thread for interacting with a twist-off crown cap for a liquid-tight closing of the dispensing opening can be formed; which closure thread is formed by a plurality of thread protrusions arranged along a partial region of the circumference at a predeterminable thread pitch, protruding from the exterior side with respect to the mouth piece body; and at a transition region between the two orifice jaws on the one hand and the guide disc on the other hand, there can be formed a discontinuity running circumferentially around the mouth piece body and arranged between the dispensing opening and the closure thread, wherein an end section of the orifice jaws, which end section adjoins the guide disc, is formed in such a manner that an exterior end of the discontinuity is offset inwards relative to an exterior surface of the mouth piece body situated between axially adjacent thread protrusions.

According to yet another exemplary embodiment of the present invention, a method for producing a mouth piece for a bottle with a twist-off crown cap closure is provided, wherein in the method a guide disc is received in a positive-locking manner in a guide disc receiving device which by means of placing together two orifice jaws is formed between the aforesaid, wherein in the placed-together state of the orifice jaws, in which state the guide disc is received, an orifice production mold is delimited by the orifice jaws and the guide disc; free-flowing mouth piece raw material is fed into the orifice production mold, such that a mouth piece body is formed between the orifice jaws; by means of the guide disc an end dispensing opening at the mouth piece body is delimited; between the orifice jaws a closure thread for interacting with a twist-off crown cap for the liquid-tight closing of the dispensing opening is formed, which closure thread is formed by means of a plurality of thread protrusions arranged along a partial region of the circumference at a predeterminable thread pitch, protruding from the exterior side of the mouth piece body; at a transition region between the two orifice jaws on the one hand and the guide disc on the other hand, there is formed a discontinuity running circumferentially around the mouth piece body, arranged between the dispensing opening and the closure thread, wherein an end section of the orifice jaws, which end section adjoins the guide disc, is formed in such a manner that an exterior end of the discontinuity is offset inwards relative to an exterior surface of the mouth piece body situated between axially adjacent thread protrusions; the mouth piece raw material fed into the orifice production mold is at least partly solidified, and consequently the mouth piece is formed, and the orifice jaws are separated and the guide disc is removed in order to remove the mouth piece.

According to yet another exemplary embodiment of the present invention, a method for producing a bottle with a twist-off crown cap closure is provided, wherein in the method a mouth piece of the bottle is produced by means of a method with the above-mentioned features; a body of the bottle connected to the mouth piece and thus integrally formed with it is formed; and (preferably after the bottle has been filled with a liquid, in particular with a beverage) a twist-off crown cap is formed to the mouth piece body and to the closure thread while forming a mating thread at the formed on twist-off crown cap in such a manner that the twist-off crown cap closes the dispensing opening so that it is liquid-tight, and encloses a section of the mouth piece body in such a manner that the mating thread interacts with the closure thread.

Exemplary embodiments of the invention are based on the surprising recognition that the cause for the hitherto inexplicable splintering when opening a bottle with a twist-off-crown mouth piece can be explained in that when a user removes the twist-off crown cap, and in this process the twist-off crown cap acts on a discontinuity on the mouth piece body and thus evidently acts on (e.g., pulls off) the region of the discontinuity (step or seam) including a region of the mouth piece body, which region is arranged above it. This can result in splintering and in a formation of sharp-edged regions at the mouth piece body. According to an exemplary embodiment it is proposed that the position of this discontinuity (which descriptively arises as a mold seam between the orifice jaws and a guide disc) is moved into a region that is protected from being acted upon by the twist-off crown cap. In this context the notion of a "protected region" refers to a position of the mold seam in which (even improper) taking off of the twist-off crown cap from the mouth piece body cannot result in undesirable detrimental acting on the twist-off crown cap at the mold seam. In order to be located in this protected region it is proposed, that the mold seam no longer is allowed to protrude beyond the core diameter of the thread. According to the invention, surprisingly, it has been found that splintering is then no longer possible.

In order to make it possible to move the mold seam to the protected region in which it is ensured that the mold seam in the radial direction of the bottle no longer protrudes as far as the core diameter of the thread, the tool can be formed accordingly.

However, it is also possible to produce a mouth piece with a conventional tool according to the above-mentioned specifications of CE.T.I.E., and to eliminate the mold seam by means of removal (for example in a machining process) or by means of re-forming the mold seam from the unprotected region.

In the following, in addition, exemplary embodiments of the mouth piece, of the bottle, of the tool for producing a mouth piece, of the method for producing a mouth piece, and of the method for producing a bottle are described.

The exterior end of the discontinuity is to be offset inwards, relative to an exterior surface of the mouth piece body situated between axially adjacent thread protrusions, by more than technically-caused tolerances of the production tool and of the production process and thus of the produced mouth piece. The production tool or the production process can thus be configured in such a manner that all the mouth pieces that have deviations within the tolerance range comprise the inwards-moved exterior edge of the discontinuity. In this way it can be ensured that all the conforming mouth pieces of a production batch provide protection against splintering. Values of tolerances due to technical factors are stated in the specifications CE.T.I.E., documentation sheet GME 14.02, edition 0703.

According to an exemplary embodiment the discontinuity can be a step or a ridge. The discontinuity can run circumferentially in a closed ring-shaped manner around the mouth piece. The step can be designed as a circular ring with a horizontal ring surface when the bottle is resting on a horizontal base as intended. The discontinuity is a consequence of a joint between the guide disc and the orifice jaws (also referred to as head pieces).

According to an exemplary embodiment the exterior end of the discontinuity can be offset inwards to such an extent that if a twist-off crown cap, that is formed to the mouth piece body, is taken off, in particular unscrewed or lifted off by means of a bottle opener, any pulling off of at least part of the discontinuity and optionally of a section of the mouth piece body, which section is arranged above the discontinuity, as a result of the twist-off crown cap detrimentally acting on the discontinuity, is made impossible. Descriptively, the discontinuity is offset, in the direction of a central axis of the bottle, relative to an alignment line of the core diameter of the closure thread.

According to an exemplary embodiment a ring-shaped exterior surface of the mouth piece body between the closure thread (in particular an upper end of the closure thread) and the discontinuity (in particular an exterior end of the closure thread) can be curved or tilted inwards (i.e. in the direction of a central axis of the bottle) relative to a ring-shaped exterior surface (in particular a surface of the circular cylinder) of the mouth piece body between axially adjacent thread protrusions. Such a tilting can take place at a constant pitch. Such a curvature can be formed in such a manner that the second derivative of a trajectory in the above-mentioned surface region of the mouth piece is other than zero. In both alternatives, descriptively, the discontinuity can be drawn into the protected region, and the bottle can thus be protected from undesirable splintering during opening.

According to an exemplary embodiment a ring-shaped exterior surface of the mouth piece body, which exterior surface starting from the discontinuity extends in the direction of the closure thread, can be convex in shape. As a result of the convex design, during the removal of a twist-off crown cap, the danger of the latter being able to act on the discontinuity is further reduced, because this would require an unnatural sideways movement.

According to an exemplary embodiment the convex ring-shaped exterior surface of the mouth piece body, which exterior surface starting from the discontinuity extends in the direction of the closure thread, can have a first radius of curvature. Another convex ring-shaped exterior surface of the mouth piece body, which exterior surface starting from the discontinuity (in particular from an interior end of the discontinuity) extends in the direction of the dispensing opening (i.e. towards the upper end of the bottle), can have a second radius of curvature. Between two convex sections which are connected by the discontinuity any undesirable detrimental acting on the twist-off crown cap so as to cause splintering or the like is made even more improbable.

According to an exemplary embodiment the first radius of curvature can be larger than the second radius of curvature. The more pronounced curvature can thus be located above the discontinuity.

According to an exemplary embodiment the discontinuity can have a radial extension (relative to a radial extension of the bottle) ranging between approximately 0.05 mm and approximately 0.25 mm, in particular ranging between approximately 0.1 mm and approximately 0.2 mm. If the discontinuity is shaped in a step wise manner, the radial extension equates to the length of the horizontal step section. If the discontinuity is ridge-shaped, the radial extension equates to the length of the horizontally projecting ridge. As a matter of course, other dimensions of the radial extension of the discontinuity are possible, depending on the selected tools or the bottles produced.

According to an exemplary embodiment the offset between the exterior end of the discontinuity and the exterior surface of the mouth piece body between axially adjacent thread protrusions can range between approximately 0.1 mm and approximately 0.4 mm, in particular can range between approximately 0.2 mm and approximately 0.3 mm. Such an offset has proven to be adequate to prevent any undesirable mechanical effect of a twist-off crown cap on the discontinuity in a reliable manner.

According to an exemplary embodiment the discontinuity can have an axial distance (relative to the bottle axis) from the dispensing opening (or from the top edge of the bottle or of the mouth piece) ranging between approximately 0.6 mm and approximately 1.0 mm, in particular ranging between approximately 0.7 mm and approximately 0.9 mm. Clearly, when compared with the specifications discussed above, the position of the discontinuity can be moved upwards along the central axis of the bottle, and consequently also that region of the bottle, which region is situated above the discontinuity, can be reduced in size and thus the quantity of potentially splintering-off glass material of the bottle can be further reduced.

According to an exemplary embodiment, if appropriate with the exception of the axial section between the closure thread (in particular the upper end of the closure thread) and the dispensing opening (i.e. the top edge of the bottle or of the mouth piece), the entire mouth piece can be produced as a twist-off-crown mouth piece 26 H 126 according to the specifications CE.T.I.E. GME 14.02, edition 07/03. Clearly, the above-mentioned specifications can continue to be applied, provided that the discontinuity is displaced in the described manner relative to the core diameter of the thread in the direction of the bottle axis.

According to an exemplary embodiment the bottle may comprise a twist-off crown cap that, as a mating thread, interacts with the closure thread, thus closing the dispensing opening in a liquid-tight manner and enclosing a section of the mouth piece body. According to an exemplary embodiment the twist-off crown cap may comprise a sheet metal cap with an inside sealing layer (for example comprising a plastic material), which sealing layer closes the dispensing opening in a liquid-tight manner, and which sheet metal cap at an inside that contacts or engages the closure thread comprises the mating thread. Such a twist-off crown cap may be made from sheet metal and may be formed at or pressed on directly above the closure thread that is formed, integrally and from the same material, as the glass bottle, and consequently at an inside of the twist-off crown cap its mating thread is automatically formed.

According to an exemplary embodiment the body of the bottle can contain a liquid, in particular a beverage. However other liquids, for example free-flowing materials, solvents or chemicals, can also be held in the bottle.

According to an exemplary embodiment the orifice jaws and the guide disc can be designed and matched in such a manner that by means of them a mouth piece with the features described above can be formed. When the orifice jaws and the guide disc are installed one against the other, they delimit a cavity that, at least at the exterior and at the top, defines the geometry of the mouth piece to be produced. At any rate this applies if the produced bottle is not reworked, for example in a machining process. With a corresponding shape of corresponding surface regions of the orifice jaws and of the guide disc, thus the above-described arrangement and dimensions of the discontinuity can be ensured in order to position said discontinuity in the protected region.

In order to produce a glass bottle according to embodiments of the invention a gob of liquid glass is dropped into the orifice production mold of the placed-together three tools, for example at 1200° C. After this, the production of the mouth piece is completed, which is subsequently cooled to a lower temperature. At this low temperature the glass material has still not entirely solidified; however, the preform can be handled for the subsequent production (for example by means of glass blowing) of a bottle body.

According to an exemplary embodiment, at a position of contact with the guide disc the orifice jaws can delimit a ring-shaped concave section of the orifice production mold. A concave section of the orifice production mold in the end region of the orifice jaws corresponds to a convex section of the mouth piece between the discontinuity and the commencement of the closure thread.

According to an exemplary embodiment the guide disc can comprise a guide groove (which forms part of the orifice production mold) that is designed in such a manner that a first curvature (for example corresponding to a first radius of curvature) of the mouth piece in a boundary region at the side of the guide disc to the discontinuity is greater than a second curvature (for example corresponding to a second radius of curvature) of the mouth piece in a boundary region at the side of the orifice jaws to the discontinuity. The first radius of curvature is then greater than the second radius of curvature.

DETAILED DESCRIPTION OF THE DRAWINGS

In the following, exemplary embodiments of the present invention are described in detail with reference to the following figures:

FIG. 2 is a representation of a conventional mouth piece of a bottle with a twist-off crown cap.

FIG. 4 is a diagrammatically representation of a discontinuity according to an embodiment of the invention, which discontinuity has been moved to a protected region, when compared to conventional positioning of the discontinuity.

FIG. 5 is a representation of by means of which a contour of a conventional mouth piece can be recognized.

FIG. 6 is a representation of by means of which a contour of a mouth piece according to an exemplary embodiment of the invention can be recognized.

Identical or similar components in different figures have the same reference numerals.

DETAILED DESCRIPTION OF EXAMPLARY EMBODIMENTS

Figure 1:
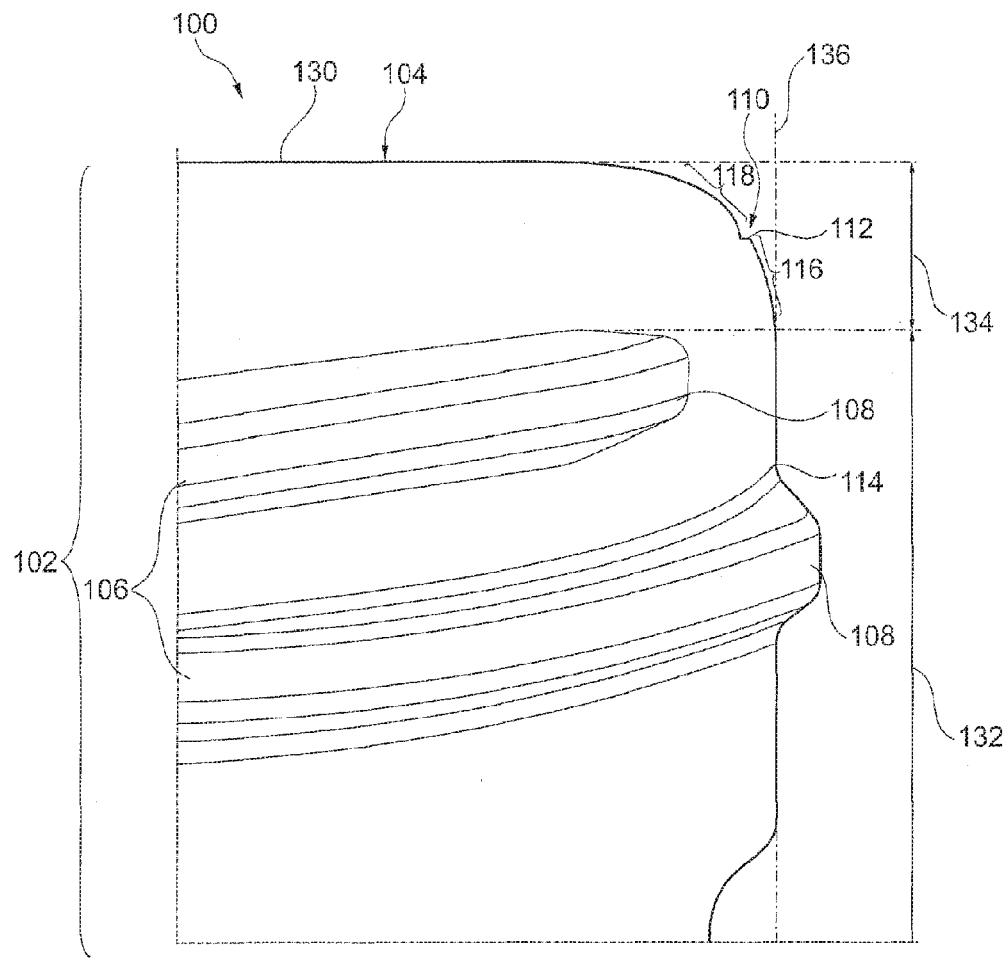
FIG. 1 shows a detail of a mouth piece for a bottle with a twist-off crown cap closure according to an exemplary embodiment of the invention.

FIG. 1 shows a mouth piece 100 of a glass bottle with a twist-off crown cap closure according to an exemplary embodiment of the invention. In FIG. 1 the rest of the bottle is not shown, nor is the twist-off crown cap.

The mouth piece 100 comprises a mouth piece body 102 that forms an upper region of the bottle. At the top 130 of the mouth piece 100 and thus of the bottle a dispensing opening 104 (in FIG. 1 merely implied) is formed centrally. A liquid contained in the bottle can be poured through the dispensing opening 104 after the twist-off crown cap has been removed from the bottle.

A closure thread 106 is made from glass in one piece with the mouth piece body 102 and serves to form a screw connection together with a twist-off crown cap. When the twist-off crown cap is in place on the mouth piece 100, a liquid-tight and if appropriate also gas-tight connection is formed at the dispensing opening 104. The sealing force is established by means of a sealing layer on the inside of the twist-off crown cap with positive-locking fit of the closure thread 106 with a corresponding mating thread of the twist-off crown cap.

As shown in FIG. 1, the closure thread 106 is shaped in the form of a plurality of thread protrusions 108 running circumferentially around the mouth piece body 102 at a predetermined thread pitch and protruding from the exterior side of the mouth piece body 102. When compared to a core diameter of the closure thread 106, which core diameter is indicated in FIG. 1 by a dashed vertical line 136, the thread protrusions 108 are formed so as to be protruding from the exterior side. In other words, in the region of the closure thread 106 the mouth piece body 102 comprises the thread protrusions 108 which prominently project relative to an exterior surface (core diameter), which in this region has the shape of a circular cylinder, of the mouth piece body 102.

Between the dispensing opening 104 and the closure thread 106 a step like mold seam running circumferentially around the mouth piece body 102 is formed as a discontinuity 110. This discontinuity 110 stems from manufacture as a result of the tool; it arises in the production of the mouth piece 100 in a transition region between two orifice jaws on the one hand, and a guide disc on the other hand. This is described below with reference to FIG. 10, FIG. 12, and FIG. 13. Descriptively, for producing a bottle or for producing the mouth piece 100 it is necessary to place together the three aforementioned tool parts (two orifice jaws and one guide disc), and after completion of casting the mouth piece 100 to remove them from the cast mouth piece. Consequently, the discontinuity 110 arises in a transition region between the orifice jaws on the one hand and the guide disc on the other hand.

According to the invention an exterior end 112 of the discontinuity 110 is offset inwards, i.e. in the direction of the central axis of the bottle or of the mouth piece 100, relative to the thread core diameter or an exterior surface 114 of the mouth piece body 102 situated between two axially adjacent thread protrusions 108. In other words, according to FIG. 1 the right-hand end and thus exterior end 112 of the discontinuity 110 is situated further inwards than the dashed alignment line that corresponds to the core diameter of the closure thread 106. With this measure the discontinuity 110 is moved to a region protected from the twist-off crown cap. Consequently, in contrast to mouth pieces that are, for example, shown in the specifications CE.T.I.E., twist-off-crown mouth piece 26 H 126, documentation sheet GME 14.02, edition 07103, a situation is prevented in which during the taking-off of a twist-off crown cap by a user the twist-off crown cap acts on the discontinuity 110, thus potentially causing a splintering on the mouth piece body. In contrast to such conventional embouchures, according to the invention the position of the discontinuity 110 has been moved inwards to such an extent that during removal of the twist-off crown cap, the twist-off crown cap does not act (e.g., pull off glass material) on the discontinuity 11 at the top of the mouth piece body 102. Consequently, the mouth piece 100 according to the invention is considerably safer in operation than conventional mouth pieces of glass bottles with a twist-off crown cap closure.

FIG. 1 further shows that a ring-shaped exterior surface 116 of the mouth piece body 102 between an upper end of the closure thread 106 and the exterior end 112 of the discontinuity 110 relative to a central axis of the bottle is curved in a convex manner relative to a ring-shaped exterior surface 114 of the mouth piece body 102 between axially adjacent thread protrusions 108. A ring-shaped exterior surface 118 of the mouth piece body 102 between the top 130 of the bottle and the interior end of the discontinuity 110 likewise comprises a convex curvature. Thus at both sides of the discontinuity 110 an overall double convex curvature of the exterior surface of the mouth piece is formed, namely by a first radius of curvature in the region of the convex ring-shaped exterior surface 116, and by a second radius of curvature in the region of the convex ring-shaped exterior surface 118. As shown in FIG. 1, the first radius of curvature is greater than the second radius of curvature, and consequently in the region of the top 130 of the bottle the curvature is more pronounced than between the discontinuity 110 and the top commencement of the closure thread 106. Even in a state in which the discontinuity 110 is formed as an outwards protruding ridge, any action by the twist-off crown cap can be prevented as a result of this curvature. The convex geometry ensures a smooth transition between vertical passages along a vertical alignment line 136 and the horizontal section in the region of the upper end 130 of the bottle.

A lower section 132 of the mouth piece 100 can be produced according to the specifications according to CE.T.I.E., documentation sheet GME 14.02, edition 07/03, wherein production of the adjacent upper section 134 differs from the example shown in the specifications in particular in that the discontinuity 110 is curved inwards and is offset relative to the vertical alignment line 136.

Descriptively, the transition between the closure thread 106 and the discontinuity 110, which is in the form of a mold seam, is not a perpendicular straight line, but instead an inwards-curved trajectory. The radius of curvature in the region of the exterior surface 118 is due to the geometry of the guide disc, whereas the radius of curvature in the region of the exterior surface 116 is due to the geometry of the orifice jaws or of the head mold.

FIG. 2 shows a cross section 200 of a conventional bottle in which a twist-off crown cap 202 has been placed on a conventional mouth piece 220. FIG. 2 shows that the twist-off crown cap 202, which can also be used according to embodiments of the invention, comprises a sheet metal cap 206 and a seal 208 arranged underneath it, which seal 208 covers the top of the mouth piece 220 in a liquid-tight manner. Such a twist-off crown cap 202 can be formed to a finished mouth piece 220 so that with a corresponding press force a mating thread 204 of the twist-off crown cap 202 forms, which interacts with a connecting thread 212 of the mouth piece 220.

FIG. 2 clearly shows a circumstance which has been recognized by the present inventor as being the cause for damage or splintering during the taking-off of the twist-off crown cap 202 according to conventional mouth pieces 220. As is evident from a region 230, a beak-shaped ridge can be damaged when the bottle is being opened by lift-off of the twist-off crown cap 202 in the direction of the arrow, in that clearly the upwards-guided twist-off crown cap 202 can act on the ridge and can pull off, in an upwards direction, this ridge together with further glass material of the mouth piece 220.

Based on this recognition, according to embodiments of the invention it is proposed that the position of the ridge (or of some other, for example step-shaped, discontinuity) be moved inwards to such an extent that when the twist-off crown cap 202 is pulled upwards such an undesirable pull-off movement can no longer occur.

Figure 3:
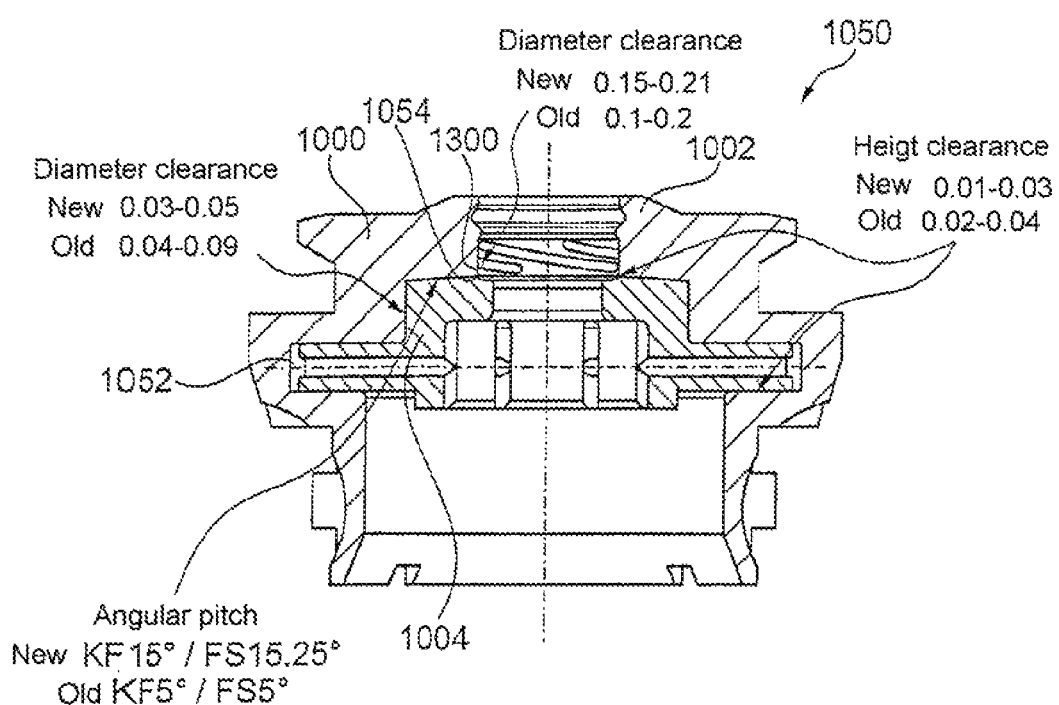
FIG. 3 shows a cross section of a three-component tool according to an embodiment of the invention for producing a mouth piece according to an exemplary embodiment of the invention.
Figure 10:
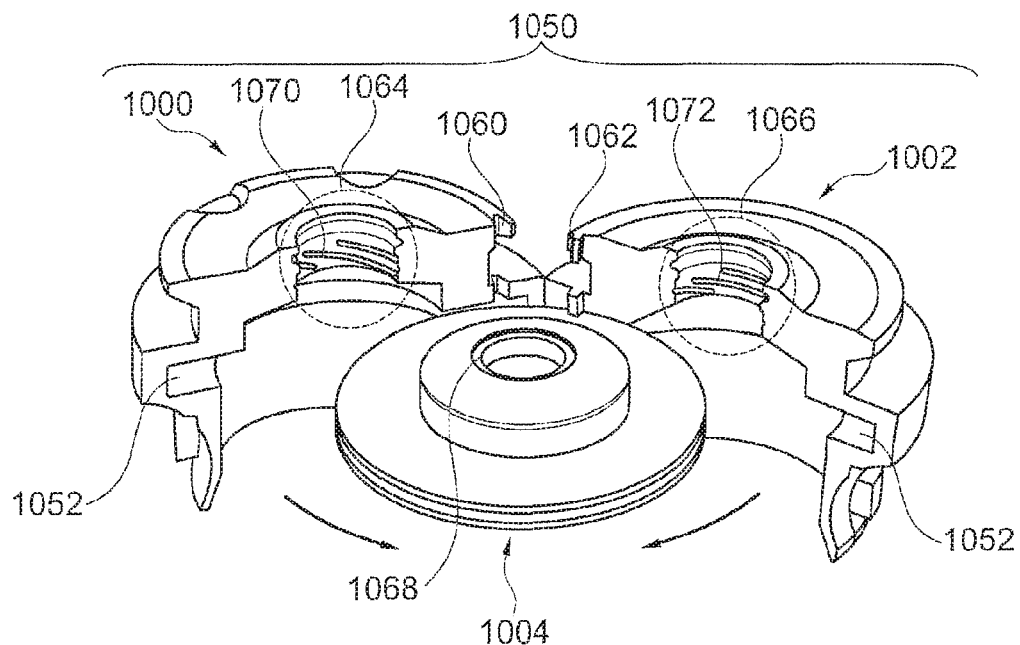
FIG. 10 shows a tool comprising two orifice jaws and a guide disc according to an exemplary embodiment of the invention in a partly placed together state.
Figure 12:
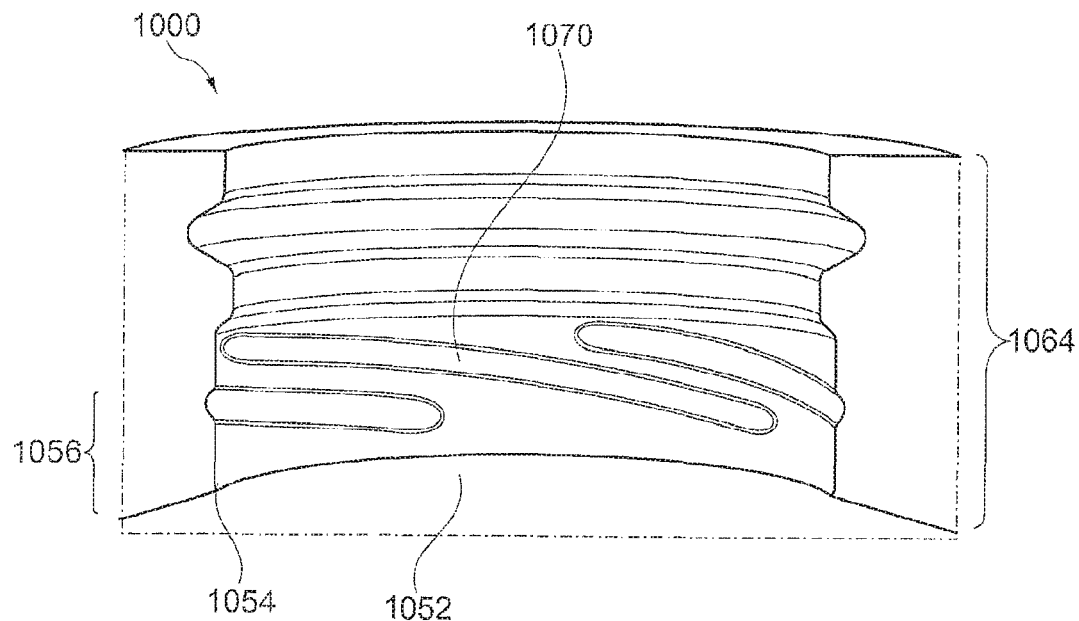
FIG. 12 shows part of an orifice production mold that is delimited by two orifice jaws.
Figure 13:
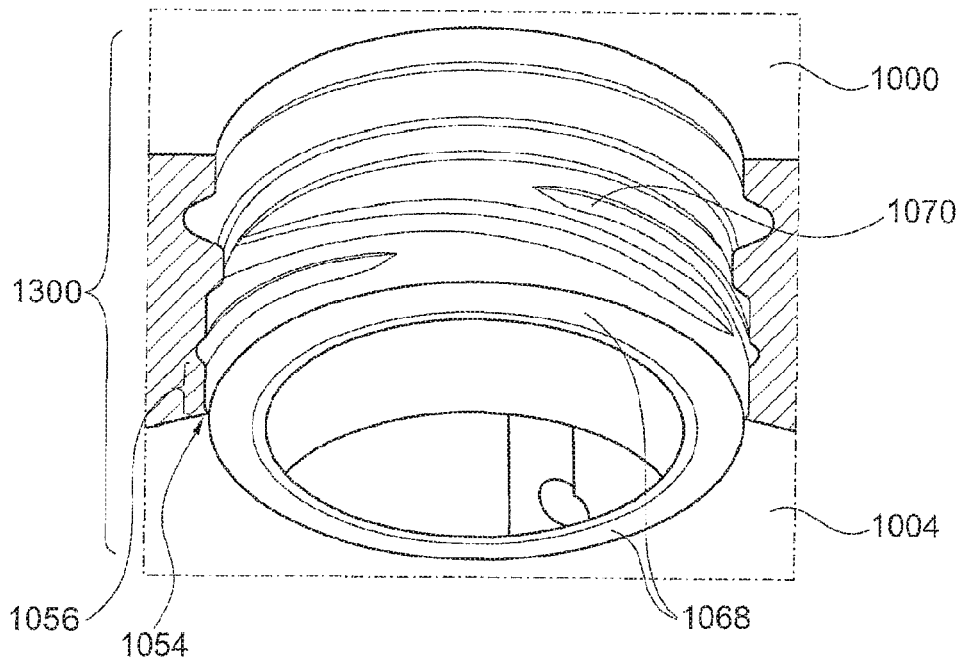
FIG. 13 shows part of an orifice production mold that is formed or delimited by one orifice jaw in combination with a guide disc.

FIG. 3 shows a tool 1050 according to an exemplary embodiment of the invention in a placed-together state. The three-component tool 1050 comprises a first orifice jaw 1000, a second orifice jaw 1002 and a guide disc 1004. The guide disc 1004 is received in a positive-locking manner in a guide disc receiving device 1052 that in the placed-together state of the two orifice jaws 1000, 1002 is formed between the aforesaid. When the guide disc 1004 and the two orifice jaws 1000, 1002 are placed together, an orifice production mold 1300 is delimited by the three tool parts 1000, 1002, 1004. If then heated up free-flowing glass is introduced into the orifice production mold 1300, in this manner a mouth piece 100 can be created. According to this production method the shape of the created mouth piece 100, as shown for example in FIG. 1, is negative or inverse relative to the shape of the orifice production mold 1300. As will be described in more detail below, in particular a transition region 1054 between the orifice jaws 1000, 1002 on the one hand and the guide disc 1004 on the other hand, causes the formation of a discontinuity 110 at the mouth piece 100. By corresponding forming, in particular, of a contact region between the orifice jaws 1000, 1002 and the guide disc 1004 this discontinuity 110 can, however, forcibly be generated in such a position that consequently the danger of splintering during the opening of a twist-off crown cap closure is averted. This results in a shape of the mouth piece 100 according to FIG. 1 and can be achieved by a design of the three tool parts 1000, 1002, 1004, which design is shown in FIG. 10, FIG. 12, and FIG. 13.

FIG. 3 further shows that tolerances can be changed at various positions of the tool 1050 in order to reliably exclude the danger of splintering. In this document the tolerances referred to as "old" relate to the conventional production of mouth pieces according to the specifications CE.T.I.E., documentation sheet GME 14.02, edition 07/03, whereas the tolerances referred to as "new" relate to a tool modified according to one exemplary embodiment of the invention for producing the mouth piece. Furthermore, as a result of the adaptation, according to embodiments of the invention, of the tolerances of the tool 1050 according to FIG. 3 the occurrence of undesirable splintering in the upper bottle region can thus be prevented.

FIG. 4 descriptively compares a shape of the mouth piece 100 according to an exemplary embodiment of the invention with a conventional form parting 400 as obtained when adhering to the above-mentioned specifications according to CE.T.I.E. Conventionally, the right-hand end of the discontinuity 412 is exactly in alignment with the core diameter of the mouth piece thread, and when the twist-off cap is pulled off, the discontinuity 412 is thus prone to be pulled off upwards together with said twist-off crown cap. In contrast to this, FIG. 4 also shows that as a result of the inventive relocation of the form parting or discontinuity 110 to a protected region, see the exterior end 112 of the discontinuity 110, such a mechanical action has been rendered mechanically extremely improbable if not impossible.

FIG. 5 again shows how a conventional mouth piece 220 is produced in the region 270 of its upper side according to the above described specifications CE.T.I.E. In this design the discontinuity 412 is in alignment 504 with the core diameter 500 between the thread protrusions 502.

In contrast to this, FIG. 6 shows in accordance with embodiments of the invention a shape and a position of the discontinuity 110 in which the two convex sections 116, 118 protectively enclose the discontinuity 110 arranged between them. In particular, FIG. 6 shows that in this exemplary embodiment the radial dimension "d", i.e. its horizontal step length, of the discontinuity 110 is approx. 0.15 mm. In the exemplary embodiment shown the offset "s" between the exterior end 112 of the discontinuity 110 and the exterior surface 114 on the core diameter of the mouth piece body 102 between axially adjacent thread protrusions 108 is approx. 0.25 mm. Furthermore, in this exemplary embodiment the axial distance "T" of the discontinuity 110 from the dispensing opening 104 or the upper bottle end 130 is 0.8 mm.

Figure 7:
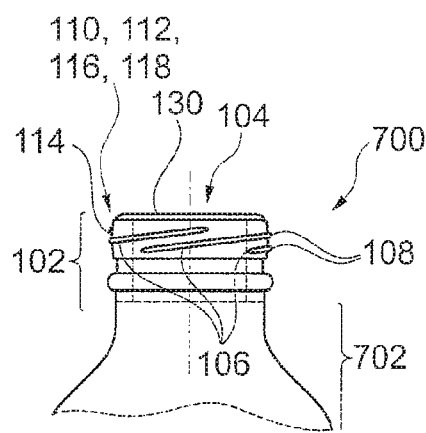
FIG. 7 shows a head region of a bottle according to an exemplary embodiment of the invention.

FIG. 7 shows a glass bottle 700 according to an exemplary embodiment of the invention. The aforesaid comprises a mouth piece 100 and a body of the bottle 702 integrally connected thereto and is made from glass. For closing, a twist-off crown cap 202, as shown in FIG. 2, can be placed on the bottle 700.

Figure 8:
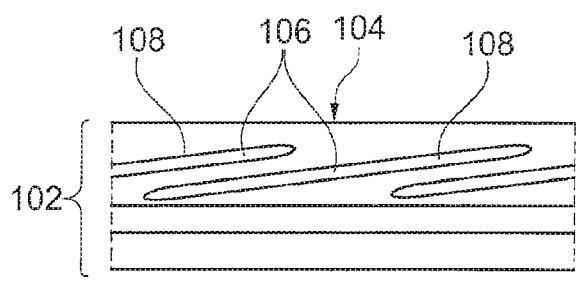
FIG. 8 shows the geometry of a closure thread that is circumferentially formed around the mouth piece body of the bottle according to FIG. 7.

FIG. 8 shows that the thread 106 of the mouth piece 100 of the bottle 700 has been formed with the use of three thread protrusions 108, each extending along a sub-region of the bottle circumference.

Figure 9:
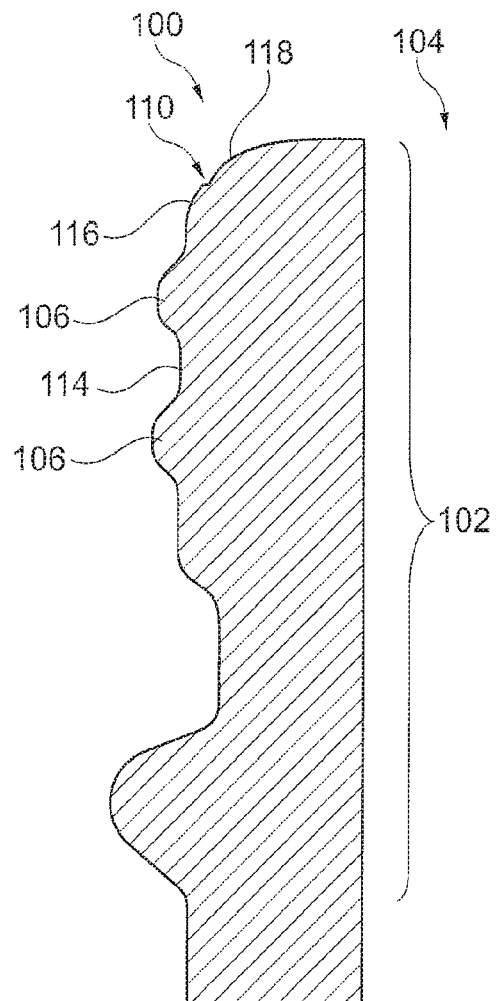
FIG. 9 shows a cross section of a bottle according to an exemplary embodiment of the invention, in which bottle a mouth piece with a discontinuity arranged within a core diameter of a closure thread is protected from undesirable pulling-off by a crown cap.

FIG. 9 shows a cross section of the mouth piece 100 according to an exemplary embodiment of the invention; it shows the manner in which the discontinuity 110 has been moved back to the protected region.

Figure 11:
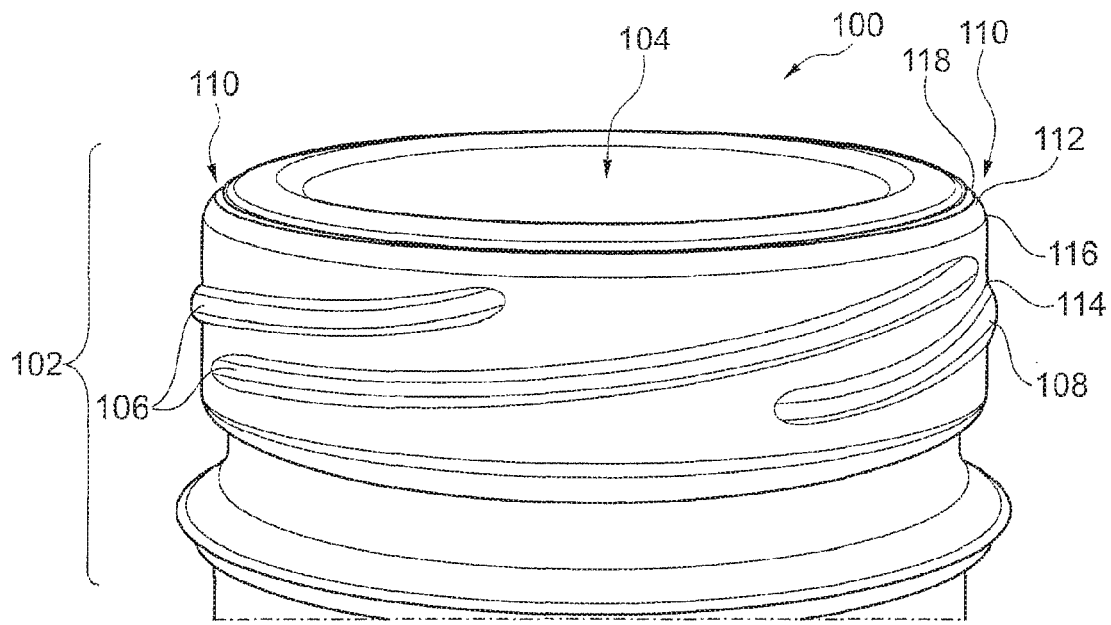
FIG. 11 is a representation of a mouth piece according to an exemplary embodiment of the invention.

FIG. 10 shows a tool 1050 for producing a mouth piece 100 as shown in FIG. 11 and comprising the above-described features according to embodiments of the invention.

As shown in FIG. 10, the tool 1050 comprises the first orifice jaw 1000 and the second orifice jaw 1002. They clearly form two half-shells for jointly forming a top main region of the orifice production mold 1300, and two half-shells for receiving the guide disc 1004. The latter can be received in a positive-locking manner in a guide disc receiving device 1052 that is formed when the two orifice jaws 1002, 1004 are placed together. This placing-together can be achieved by hinging (see arrows in FIG. 10) the two orifice jaws 1000, 1002 towards each other. This also results in mutual engagement of corresponding connecting elements 1060, 1062 of the orifice jaws 1000, 1002. The orifice jaws 1000, 1002 can also be referred to as the head piece. In the placed-together state of the orifice jaws 1000, 1002 a first bottleneck-shoulder half-mold 1064 and a second bottleneck-shoulder half-mold 1066 together form the upper region of the orifice production mold 1300. A ring groove 1068, which is formed in an upper region of the guide disc 1004 and in the placed-together state of the tool 1000 contacts the bottom end of the bottleneck-shoulder half-molds 1064, 1066, delimits the lower region of the orifice production mold 1300. The discontinuity 110 is formed precisely on the boundary between the lower end of the bottleneck-shoulder half-molds 1064, 1066 on the one hand, and the ring groove 1068 of the guide disc 1004 on the other hand.

When the three tool components 1000, 1002, 1004 are placed together and free-flowing glass material is introduced into the orifice production mold 1300 created in this manner, a mouth piece 100 according to embodiments of the invention is formed. In particular, the mouth piece body 102 is formed between the orifice jaws 1000, 1002. By means of the guide disc 1004, more precisely expressed by means of the ring groove 1068, the end dispensing opening 104 in the mouth piece body 102 is delimited, or the top edge 130 of the bottle is produced. Between the orifice jaws 1000, 1002 the closure thread 106 is formed to interact with a twist-off crown cap thread. This closure thread 106 is formed in the shape of a plurality of protrusions 108 that at a predeterminable thread pitch run circumferentially around the mouth piece body. This closure thread 106 is formed by the corresponding thread grooves 1070, 1072 of the bottleneck-shoulder half-molds 1064, 1066.

Finally, as shown in FIG. 12, in a transition region 1054 between the orifice discs 1000, 1002 on the one hand and the guide disc 1004 on the other hand, a discontinuity 110 arranged between the dispensing opening 104 and the closure thread 106, running circumferentially around the mouth piece body 102, is formed. An end section 1056 of the orifice jaws 1000, 1002, which end section 1056 adjoins the guide disc 1004, is formed in such a manner that an exterior end 112 of the discontinuity 110, between axially adjacent thread protrusions 108, is offset inwards relative to an exterior surface 114 of the mouth piece body 102.

FIG. 12 shows a detailed view of the orifice jaw 1000, in particular of the bottleneck-shoulder half-mold 1064. FIG. 12 shows, in particular, that in the region 1056 a concavely curved section of the orifice production mold 1300 makes it possible to offset the discontinuity 110 towards the inside and into a convex region of the exterior surface of the mouth piece.

FIG. 13 shows a detailed view of the orifice jaw 1000, which in this illustration has been placed together with the guide disc 1004. Also shown is a contact location 1054 on which the discontinuity 110 is formed.

In addition, it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference numerals in the claims are not to be interpreted as limitations.

The invention claimed is:

1. A mouth piece for a bottle with a twist-off crown cap closure, wherein the mouth piece comprises:
   a mouth piece body with a dispensing opening at the end;
   a closure thread for interacting with a twist-off crown cap in order to close off the dispensing opening so that it is liquid-tight, which closure thread is formed by a plurality of thread protrusions arranged along a partial region of the circumference of the mouth piece body at a predetermined thread pitch, the plurality of thread protrusions protruding from the exterior side of the mouth piece body; and
   a discontinuity running circumferentially around the mouth piece body, arranged between the dispensing opening and the closure thread, and formed as a result of a tool during a manufacture of the mouth piece in a transition region between two orifice jaws on the one hand and a guide disc on the other hand; wherein an exterior end of the discontinuity is offset inwards relative to an exterior surface of the mouth piece body situated between axially adjacent thread protrusions,
   a first ring-shaped exterior surface of the mouth piece body, the first ring-shaped exterior surface starting from the discontinuity and extending in a direction of the closure thread, wherein:
      the first ring-shaped exterior surface is formed convex in shape, and
      the first ring-shaped exterior surface includes a first radius of curvature;
   a second ring-shaped exterior surface of the mouth piece body, the second ring-shaped exterior surface starting from the discontinuity and extending in a direction of the dispensing opening, wherein:
      the second ring-shaped exterior surface is formed convex in shape, and
      the second ring-shaped exterior surface has a second radius of curvature; and wherein the first radius of curvature is greater than the second radius of curvature.

2. The mouth piece as set forth in claim 1, wherein the discontinuity is a step or a ridge.

3. The mouth piece as set forth in claim 1, wherein the exterior end of the discontinuity is offset inwards to such an extent that when a twist-off crown cap that is formed to the mouth piece body is taken off, when unscrewed or lifted off by means of a bottle opener, any pulling off of at least part of the discontinuity and of a section of the mouth piece body, which section is arranged above the discontinuity, as a result of the twist-off crown cap acting on the discontinuity is made mechanically impossible.

4. The mouth piece as set forth in claim 1, wherein a ring-shaped exterior surface of the mouth piece body between the closure thread and the discontinuity is curved or tilted inwards relative to a ring-shaped exterior surface of the mouth piece body between axially adjacent thread protrusions.

5. The mouth piece as set forth in claim 1, wherein the discontinuity comprises a radial extension, ranging between 0.05 mm and 0.25 mm.

6. The mouth piece as set forth in claim 1, wherein the offset between the exterior end of the discontinuity and the exterior surface of the mouth piece body between axially adjacent thread protrusions ranges between 0.1 mm and 0.4 mm.

7. The mouth piece as set forth in claim 1, wherein the discontinuity has an axial distance from the dispensing opening ranging between 0.6 mm and 1.0 mm.

8. The mouth piece as set forth in claim 7, wherein, if appropriate with the exception of the axial section between the closure thread and the dispensing opening, the entire mouth piece is produced as a twist-off-crown mouth piece 26 H 126 according to the specifications CE.T.I.E. GME 14.02 edition 07/03.

9. A bottle comprising:
a mouth piece , and a body of the bottle integrally formed and connected thereto;
wherein the mouth piece comprises:
a mouth piece body with a dispensing opening at the end;
a closure thread for interacting with a twist-off crown cap in order to close off the dispensing opening so that it is liquid-tight, which closure thread is formed by a plurality of thread protrusions arranged along a partial region of the circumference of the mouth piece body at a predetermined thread pitch, the plurality of thread protrusions protruding from the exterior side of the mouth piece body; and
a discontinuity running circumferentially around the mouth piece body, arranged between the dispensing opening and the closure thread, and formed as a result of a tool during a manufacture of the mouth piece in a transition region between two orifice jaws on the one hand and a guide disc on the other hand; wherein an exterior end of the discontinuity is offset inwards relative to an exterior surface of the mouth piece body situated between axially adjacent thread protrusions,
a first ring-shaped exterior surface of the mouth piece body, the first ring-shaped exterior surface starting from the discontinuity and extending in a direction of the closure thread, wherein:
the first ring-shaped exterior surface is formed convex in shape, and
the first ring-shaped exterior surface includes a first radius of curvature;
a second ring-shaped exterior surface of the mouth piece body, the second ring-shaped exterior surface starting from the discontinuity and extending in a direction of the dispensing opening, wherein:
the second ring-shaped exterior surface is formed convex in shape, and
the second ring-shaped exterior surface has a second radius of curvature; and
wherein the first radius of curvature is greater than the second radius of curvature.

10. The bottle as set forth in claim 9, comprising a twist-off crown cap that, as a mating thready interacts with the closure thread, thus closing off the dispensing opening in a liquid-tight manner and enclosing a section of the mouth piece body.

11. The bottle as set forth in claim 10, wherein the twist-off crown cap comprises a sheet metal cap with an inside sealing layer , which sealing layer closes the dispensing opening in a liquid-tight manner, and which sheet metal cap at an inside, that engages the closure thread, comprises the mating thread.

12. The bottle as set forth in claim 9, wherein the body of the bottle is filled with a liquid.

13. A tool for producing a mouth piece for a bottle with a twist-off crown cap closure, wherein the tool comprises:
two orifice jaws; and
a guide disc that can be received in a positive-locking manner in a guide disc receiving device, which guide disc receiving device in a placed-together state of the orifice jaws is formed between them; wherein in the placed-together state of the orifice jaws, in which state the guide disc is received, an accordingly formed orifice production mold is delimited by the orifice jaws and by the guide disc in such a manner that by means of a supply of a free-flowing mouth piece raw material to the orifice production mold:
a mouth piece body can be formed in between the orifice jaws;
by means of the guide disc an end side dispensing opening on the mouth piece body is delimited;
between the orifice jaws a closure thread can be formed for interacting with a twist-off crown cap in order to close off the dispensing opening so that it is liquid-tight, which closure thread is formed by a plurality of thread protrusions arranged along a partial region of the circumference of the mouth piece body at a predetermined thread pitch, protruding from the exterior side with respect to the mouth piece body; and
at a transition region between the two orifice jaws on the one hand and the guide disc on the other hand, there can be formed a discontinuity running circumferentially around the mouth piece body and arranged between the dispensing opening and the closure thread, wherein an end section of the orifice jaws, which end section adjoins the guide disc, is formed in such a manner that an exterior end of the discontinuity is offset inwards relative to an exterior surface of the mouth piece body situated between axially adjacent thread protrusions,
wherein the guide disc comprises a guide groove that is designed in such a manner that a second curvature of the mouth piece in a boundary region at the side of the guide disc to the discontinuity is greater than a first curvature of the mouth piece in a boundary region at the side of the orifice jaws to the discontinuity.

14. The tool as set forth in claim 13, wherein the orifice jaws and the guide disc are designed and matched in such a manner that by means of them a mouth piece can be formed;

wherein the mouth piece comprises:

a mouth piece body with a dispensing opening at the end;

a closure thread for interacting with a twist-off crown cap in order to close off the dispensing opening so that it is liquid-tight, which closure thread is formed by a plurality of thread protrusions arranged along a partial region of the circumference of the mouth piece body at a predetermined thread pitch, the plurality of thread protrusions protruding from the exterior side of the mouth piece body; and a discontinuity running circumferentially around the mouth piece body, arranged between the dispensing opening and the closure thread, and formed as a result of a tool during a manufacture of the mouth piece in a transition region between two orifice jaws on the one hand and a guide disc on the other hand; wherein an exterior end of the discontinuity is offset inwards relative to an exterior surface of the mouth piece body situated between axially adjacent thread protrusions.

15. The tool as set forth in claim 13, wherein at a position of contact with the guide disc the orifice jaws delimit a ring-shaped concave section of the orifice production mold.

* * * * *